Patented Jan. 9, 1951

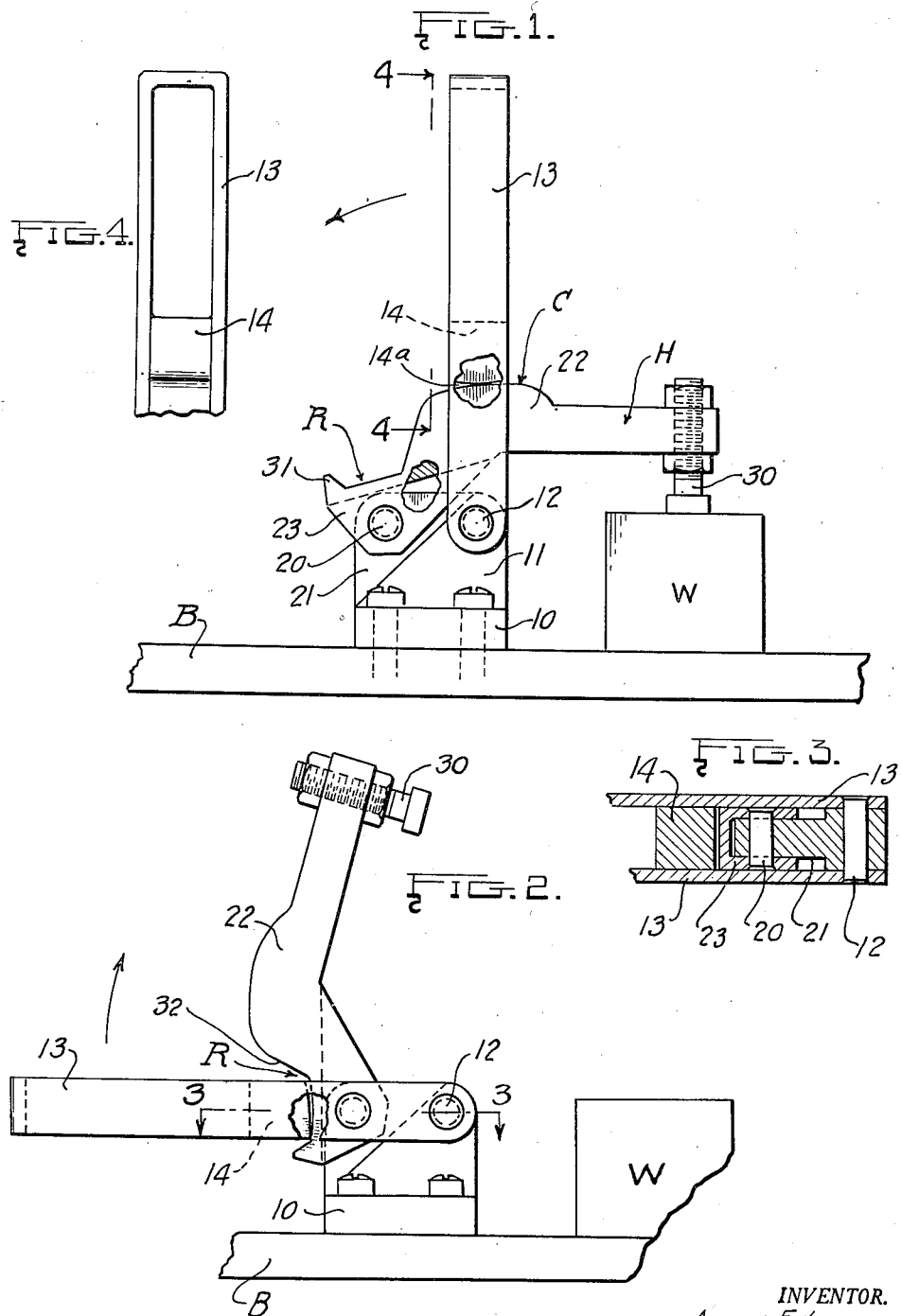

2,537,594

UNITED STATES PATENT OFFICE 2,537,594

QUICK-ACTING HOLD-DOWN CAM CLAMP

Albert F. Lehmann, Detroit, Mich., assignor to Special Engineering Service, Incorporated, Detroit, Mich., a corporation of Michigan Application June 9, 1944, Serial No. 539,416

3 Claims. (Cl. 144—290)

This invention relates to a clamp.

In a machine shop various types of clamps are used for holding work to a supporting surface while machining operations are being performed on the work or other finishing or checking operations are being performed. In some cases a small operation on a large number of pieces of the same shape and size requires that the piece be temporarily clamped in place then removed and another one inserted. There might be slight variations in the size of these pieces but on the whole they probably would have much the same clamping dimensions.

The present invention has as its object a provision of a clamp for these pieces of work which will hold them securely in spite of small variations of dimensions and which may be readily opened and closed so that the work pieces may be replaced rapidly. A further object is to provide a clamp which has a positive action without the necessity of any springs. A further object is to provide a clamp in which the pressure is accumulative and gradually increasing. This distinguishes the clamp from the usual toggle type of clamp wherein the pressure reaches a peak at a certain point and then reduces.

In the drawings:

Fig. 1 illustrates a view of the clamp in clamping position.

Fig. 2 shows the clamp in released position.

Fig. 3 is a sectional view on line 3—3 of Fig. 2.

Fig. 4 is a side elevation on line 4—4 of Fig. 1.

A work table or base plate B is shown in the drawings with a piece of work W resting thereon. The clamp consists of an inverted T-shaped member having a horizontal portion 10 and a vertically extending portion 11. At the point 12 on member 11 is pivoted an operating arm or straddling member 13 having sides which come down on either side of the member 11. Within this member 13 is a small block 14 the purpose of which will appear later. At point 20 on member 11 the width of the member is reduced as at 21 and an arm 22 has a bifurcated portion with sides 23 which are pivoted at this point 20. This arm 22 has a holding portion H, a cam portion C, and a release portion R.

The cam portion C is shaped as shown in Fig. 1 and Fig. 2 to cooperate with the curved portion 14a of piece 14. When the arm is in clamping position the piece 14 rides up on the cam portion C and holds the arm in place. On the holding portion H of the arm is a threaded stem 30 which is adjustable and arranged to contact the work. The release portion of the arm has a point 31 which also cooperates with the member 14 of the handle 13. This member 14 on its downward movement in the direction of the arrow of Fig. 1 contacts the heel 31 which is located behind the pivot point 20. Backward movement of the operating arm 13 will strike heel 31 and kick arm 22 about point 20 to the position shown in Fig. 2 at which time the member 14 is received in the recess R of arm 22. In this position the clamping arm 22 is in a gravitationally stable position where the back of the bifurcated portion 23 contacts the edge of the reduced portion 21 of the member 11 to serve as a stop. Figures 2 and 3.

When clamping movement is again desired the handle 13 will be moved upwardly in the direction of the arrow of Fig. 2 at which time the block 14 will contact surface 32 leading to the cam surface C and cause the arm to fall toward the work. As it reaches the work the block 14 will move over the cam surface to a clamping point.

For any desired piece of work the operator can adjust a member 30 to a certain position relative to H. After that work pieces of substantially the same dimensions may be quickly inserted and removed from the clamp. The operator need only strike the member 13 a sharp blow to release with a follow-up movement to throw the parts into the position of Fig. 2. A quick upward movement will again cause the clamping after the work pieces have been exchanged.

Due to the shape and positioning of the cam and cam block, the positioning of the pivots 12 and 20 and the arrangement of the actuating and clamping members, it will be seen that a positive clamping action of relatively great force is obtained with an extremely simple and short movement of the actuating lever 13.

It will be understood that in referring in the specification and claims to the vertical or horizontal positions of the various elements of the clamp that these horizontal and/or vertical positions are relative to the base B, it being obvious that the base B can assume many different positions without changing the operating features of the clamp itself.

What I claim is:

1. A clamp comprising a base having an operating arm and a clamping arm pivoted thereto at spaced points, a cam surface on said clamping arm on one side of its pivot point and a heel on said clamping arm on the other side of its pivot point, means on the operating arm contacting with the cam on the clamping arm to cause clamping in one position and kicking the heel and the clamping arm to release in another position, and a third contact surface on said clamping arm intermediate said cam surface and said heel to cooperate with said means to cause said clamping arm to move to clamping position, said arms being freely movable with respect to each other except at said contact points.

2. In a quick action production clamp comprising a base member, an operating arm and a clamping arm mounted on said base for movement on parallel spaced axes, a cam surface on said clamping arm on the work side of its mounting axis and a heel on said clamping arm on the other side of its mounting axis, means on said operating arm operable to contact the cam surface of the clamping arm to exert clamping force on said arm in clamping position, said means being positioned to contact said heel to kick the heel and the clamping arm to release position, and an intermediate surface between said heel and cam surface on the work side of the clamping arm axes positioned to be contacted to knock said clamping arm into work clamping position as said operating arm is moved to a clamping position, said arms being freely movable with respect to each other except at said heel and surface contact points.

3. A clamp comprising a base having an operation arm and a clamping arm pivoted thereto at spaced pionts, a cam surface on said clamping arm on one side of its pivot point and a heel on said clamping arm composed of an extension of the arm beyond the base on the other side of its pivot point, the clamping arm being pivoted adjacent a vertical wall of the base, the bottom of said heel extension being positioned to contact said wall to serve as a stop for the clamping arm and provide a gravitationally stable release position with said clamping arm extending substantially vertically above said base, means on said operating arm operable to contact the cam surface of the clamping arm to exert clamping force on said arm in clamping position, said means being positioned to contact the top of said heel to kick the heel and the clamping arm to release position, and an intermediate surface adjoining said cam surface positioned to be contacted to knock said clamping arm into work clamping position as said operating arm is moved to a clamping position, said arms being freely movable with respect to each other except at said heel and surface contact points.

ALBERT F. LEHMANN.

REFERENCES CITED

The following references are of record in the file of this patent:

UNITED STATES PATENTS

| Number | Name | Date |
|---|---|---|
| 591,421 | Palmer et al. | Oct. 12, 1897 |
| 834,402 | Peick | Oct. 30, 1906 |
| 2,236,439 | McKenna | Mar. 25, 1941 |

FOREIGN PATENTS

| Number | Country | Date |
|---|---|---|
| 433,446 | Great Britain | Aug. 14, 1935 |